United States Patent
Götz et al.

(10) Patent No.: US 11,509,430 B2
(45) Date of Patent: Nov. 22, 2022

(54) METHOD FOR OPERATING AN AUTOMATION NETWORK HAVING PACKET-BASED COMMUNICATION BETWEEN A HOST AND CLIENT

(71) Applicant: Siemens Aktiengesellschaft, Munich (DE)

(72) Inventors: Jan Götz, Buckenhof (DE); Alexander Pelzer, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 19 days.

(21) Appl. No.: 17/166,314

(22) Filed: Feb. 3, 2021

(65) Prior Publication Data
US 2021/0242973 A1    Aug. 5, 2021

(30) Foreign Application Priority Data
Feb. 4, 2020 (EP) ..................................... 20155402

(51) Int. Cl.
| | | |
|---|---|---|
| *H04L 1/18* | (2006.01) | |
| *H04L 1/00* | (2006.01) | |
| *H04L 47/2483* | (2022.01) | |
| *H04L 69/22* | (2022.01) | |
| *H04L 67/01* | (2022.01) | |

(52) U.S. Cl.
CPC ............ *H04L 1/189* (2013.01); *H04L 1/0002* (2013.01); *H04L 47/2483* (2013.01); *H04L 67/01* (2022.05); *H04L 69/22* (2013.01)

(58) Field of Classification Search
CPC ... H04L 1/1819; H04L 69/22; H04L 67/1021; H04L 1/0002; H04L 47/2483; H04L 67/42
See application file for complete search history.

(56) References Cited

U.S. PATENT DOCUMENTS

| | | | | |
|---|---|---|---|---|
| 6,549,886 B1 * | 4/2003 | Partalo | ................ | H04L 12/6418 704/211 |
| 7,274,661 B2 * | 9/2007 | Harrell | .................... | H04L 47/12 375/E7.014 |

(Continued)

FOREIGN PATENT DOCUMENTS

| | | |
|---|---|---|
| DE | 10332360 | 2/2005 |
| DE | 102007046326 | 4/2009 |

(Continued)

OTHER PUBLICATIONS

Search Report dated Jul. 29, 2021 issued in European Patent Application No. 20155402.9.

*Primary Examiner* — Esaw T Abraham
(74) *Attorney, Agent, or Firm* — Cozen O'Connor (57) ABSTRACT

An automation network provides packet-based communication between the host and a client, wherein the client determines output values from the host in the event of errors in the communication between the host and the client, where the determination of output data can be performed in a separate local processing module in accordance with a less complex method than on the host, such that it becomes possible to perform complex open-loop and closed-loop control tasks on the host even in the case of mobile clients or other clients that are difficult to wire.

15 Claims, 10 Drawing Sheets

(56) References Cited

U.S. PATENT DOCUMENTS

| | | | |
|---|---|---|---|
| 7,352,743 B2* | 4/2008 | Hameleers | G08G 1/09 |
| | | | 370/328 |
| 8,305,904 B1* | 11/2012 | Bentley | H04L 69/40 |
| | | | 370/241 |
| 8,537,859 B2* | 9/2013 | Traub | H04L 47/34 |
| | | | 370/473 |
| 8,582,465 B2* | 11/2013 | Ramalho | H04L 43/0829 |
| | | | 370/252 |
| 9,094,200 B2* | 7/2015 | Zheng | H04L 1/1877 |
| 9,137,293 B2* | 9/2015 | Chang | H04L 67/06 |
| 9,462,305 B2* | 10/2016 | Van Zijst | H04L 47/125 |
| 9,923,665 B2* | 3/2018 | Callard | H04L 1/0041 |
| 10,057,014 B2* | 8/2018 | Chang | H04L 1/0015 |
| 10,523,985 B2* | 12/2019 | Visscher | H04N 21/4622 |
| 2006/0224699 A1 | 10/2006 | Kruse et al. | |
| 2009/0083391 A1 | 3/2009 | Oh Yang | |
| 2011/0087943 A1 | 4/2011 | Mangione-Smith et al. | |

FOREIGN PATENT DOCUMENTS

| | | |
|---|---|---|
| DE | 112010004006 | 1/2013 |
| DE | 102014201948 | 8/2015 |

* cited by examiner

FIG 7

METHOD FOR OPERATING AN AUTOMATION NETWORK HAVING PACKET-BASED COMMUNICATION BETWEEN A HOST AND CLIENT

BACKGROUND OF THE INVENTION

1. Field of the Invention

The present invention relates to an automation network in which packet-based communication occurs between a host and clients, a host and a client in this automation network, and to a method for operating such an automation network.

2. Description of the Related Art

Host-client systems are used in automation networks. Here, the host often undertakes complex open-loop control tasks with the inclusion of the data from many clients. The input data from these clients are made available to the clients by the system that is controlled by the respective client. The systems controlled by the clients may be, for example, drones, individual industrial trucks in a warehouse or components of a complex production machine, such as motors for drives, pumps, switches, or valves. The input data may be data that describe properties of the connected system, such as switching states (e.g., states of limit switches), motor speeds, speeds, temperatures, pressures, or filling levels. These input data are processed in the host. In the next step, the host provides the individual clients with data that are forwarded by the client, as output data, to the connected system, for example, as switching outputs for controlling actuators, or numerical desired values for the open-loop control of motors.

Such a host-client architecture is selected for two reasons. On the one hand, the capacity needed for the open-loop control of complex systems (number of computing operations, or memories) is intended to be centrally provided in a computing center or the cloud, such as on a multiplicity of servers. The interaction between the (sub)systems controlled by the individual clients can therefore be appropriately considered. On the other hand, the clients in the systems are intended to be equipped in situ as simply as possible in technical terms, i.e., with as few electronic components as possible and with low capacity. Therefore, open-loop and closed-loop control tasks are preferably performed by a central entity instead of by the clients in situ.

Communication in such a host-client system can be performed in a wired manner via Profibus, Profinet or Ethernet, for example. However, wireless communication via radio is better suited to the open-loop and closed-loop control of mobile systems. Packet-based standards of digital radio transmission, such as the wireless variants of the above-mentioned connections as well as 3G, 4G, or 5G are used for this purpose.

For the division of the tasks between the client and the host for the open-loop and closed-loop control of the systems connected to the automation network, there is a substantial limitation in the latency of wireless communication. With the previously widespread standards, tasks to be performed in the time range of individual milliseconds must be processed in the client in situ since the transmission to the host and back takes too much time to enable processing on the host. Sensor data can therefore be transmitted from the client to the host, for example, the location and the speed of an industrial truck. These data can be used by the host, for example, to track and archive the movement of an industrial truck.

With the progressive reduction in the latencies in wireless communication, which is less than 1 ms in the 5G standard URLLC, for example, there are more possible ways of performing tasks on the host. For example, the route of a mode of transport can be recalculated or closed-loop control operations can be performed on the host if wireless digital communication is performed using this standard. This is advantageous, in particular, because appropriate capacities (number of computing operations, or memories) can be kept available more easily on a stationary host than on the client of a simple mobile system. Accordingly, more complex closed-loop control algorithms can be performed on the host than on a client. This expands and improves the possibilities for open-loop and closed-loop control.

However, here the problem arises of all packets not always being able to be immediately transmitted during packet communication. Delays during the transmission from the host to the client or from the client to the host result. Whereas all packets are normally transmitted, albeit with a delay, these delays result in not enough data being available to a mode of transport, for example, in order to continue its transport route or in the closed-loop control quality being impaired.

SUMMARY OF THE INVENTION

In view of the foregoing, it is an object of the present invention to improve the operation of automation networks with packet-based communication between a host and a client.

This and other objects an advantages are achieved in accordance with the invention by a method for operating an automation network having a host device, at least one client device and a packet-based communication connection between the host device and the client device, in which the client device generates and transmits input value packets to the host device via the communication connection, the host device generates and transmits output value packets to the client device via the communication connection, and the client device generates a replacement output value packet if the client device does not receive at least one output value packet within a predefined period via the communication connection.

If delays occur when transmitting an input value packet from the client to the host, then the result is that the host is can no longer process the open-loop and/or closed-loop control tasks that must be performed quickly and can no longer transmit corresponding output value packets to the client. The input value packet therefore does not arrive at the host in the anticipated number of process cycles. Delays may likewise occur when transmitting output value packets in the direction from the host to the client. The result may therefore be that the client does not register the reception of the expected corresponding output value packet after a predetermined number of process cycles, after the transmission of an input value packet. This predetermined number of process cycles, i.e., a predetermined time, is therefore considered to be an untimely reception of a packet, irrespective of whether the direction from the client to the host or the direction from the host to the client is involved. Such an untimely reception of a packet therefore results in the client no longer being able to provide the system connected to the automation network with the required output data. In order to avoid the above-described negative consequences, the client itself undertakes the necessary generation of an output value packet, i.e., a "replacement output value packet", in this event of untimely reception of a packet. If the host does not receive an expected input value packet after the predefined number of process cycles, then the host can transmit a signal to the client to generate a replacement output value packet itself.

In accordance with a second embodiment, the method is expanded by virtue of the fact that the replacement output value packets are generated by the client device based on at least one base operating point predetermined by the host device.

Open-loop and closed-loop control processes are often performed in the region of operating points at which a particular behavior of the open-loop or closed-loop control can be predicted. Here, operating points are states that are predefined by the properties of the system controlled by the client and are also influenced by environmental parameters. In the case of simple electrical drives, the operating point is predefined, for example, by the speed of the driven part and the torque of the electric motor. The operating point of an industrial truck is determined by internal parameters, such as speed and steering lock, and by external parameters such as the mass of the conveyed load. In the case of drones, speed, location, altitude, wind speed and temperature, for example, are parameters that determine the operating point. In the case of production machines, the operating point is determined via the position of switches, valves, delivery rates and drive speeds. The operating point may also be formed by more complex parameters, such as the derivatives of simple parameters, as were mentioned above by way of example.

More precisely, the replacement output value packets are determined based on the actual current operating point, i.e., the actual current state of the system, relative to an operating point referred to as a base operating point. This base operating point is determined in advance by the host. It should be understood that a plurality of base operating points may also be determined. In the case of industrial trucks and drones, such base operating points may be journeys or flights without a load and journeys or flights with a low, medium or high load.

In the normal course of communication of input value packets and output value packets, the host can determine such a base operating point with a predictable behavior. The host can then transmit further data to the client independently of the normal processing of the current open-loop and/or closed-loop control task. These data comprise, for example, the behavior for the open-loop or closed-loop control in the region around this base operating point. This behavior may be based on a less complex algorithm than the algorithm running on the host. Although the same closed-loop control quality as with the closed-loop control on the host is then not achieved, failure or a standstill of the closed-loop control can be avoided if packets are received with a delay. The client can then itself generate the output value packets, i.e., replacement output value packets, based on the rules for the behavior in the region around this base operating point. This closed-loop control by the client can also be constantly performed in parallel with the generation of the output value packets on the host.

In accordance with a third embodiment, the method is expanded by virtue of the fact that the replacement output value packets are generated by the client device with the aid of a local processing module assigned to the client device.

Here, a module is understood as meaning an element that can be implemented in hardware, firmware or software. When implemented as software, it may be a program module, i.e., executable code.

The less complex algorithm that is mentioned in the second embodiment and is used by the client to generate the replacement output value packets can be implemented in a separate module on the client. Such a local processing module on the client can be provided as a software program, as firmware or as separate hardware. Another algorithm independent of the operating point can also be used.

In accordance with a fourth embodiment, the method is expanded by virtue of the fact that the host device transmits parameters for the local processing module to the client device.

Such parameters for the local processing module may be, for example, suitable parameters of a fixed algorithm that is processed by the local processing module. The algorithm in the local processing module may be based, for example, on a low-order system of equations which represents a quasi-steady state at the base operating point with sufficient accuracy. In a more complex case, the local processing module may contain a state machine. Parameter sets are needed to operate this state machine. The host has determined these parameter sets beforehand based on the state of the system connected to the client, based on the internal state of the host and/or based on the states of other clients.

In accordance with a fifth embodiment, the method in accordance with the third or fourth embodiment is expanded by the host device transmitting the local processing module to the client device.

It is also possible for the host to completely transmit the local processing module to the client. The host creates the local processing module based on the current state of the closed-loop or open-loop control. This can be advantageously implemented in the form of flexible runtimes based on apps on the client.

In accordance with a sixth embodiment, the method in accordance with the second embodiment is expanded by the host device determining the at least one predetermined base operating point at predetermined times.

In the method in accordance with the second embodiment, it is important to take into account changes in the operating point. So that such changes can be captured, the host repeats the determination of base operating points, which are likely to become valid in the near term, at particular times, such as periodically. The times of the determination or intervals of time between successive determinations of operating points should be determined based on the system to be monitored. The base operating points may likewise be determined based on input value packets from the respective client and/or from other clients or based on the state of the entire automation network. As already described in connection with the second embodiment, it should be understood that a plurality of possible base operating points may be determined.

In accordance with a seventh embodiment, the method in accordance with one of the first to sixth embodiments is expanded by the following step of: the host device generating the output value packets in an accelerated manner until the host device has processed a current input value packet in a timely manner in the event that at least one input value packet is not received within a predefined period on the communication connection in the direction from the client device to the host device, and the client device generating the replacement output value packets in a continued manner until a current input value packet has been received on the host device and the host device generates the output value packets from this time on.

If input value packets delayed during communication from the client to the host finally arrive at the host, then the corresponding routine on the host performs accelerated processing of the respective closed-loop or open-loop control processes. This means that the corresponding closed-loop or open-loop control is performed more quickly than during normal operation. It is therefore possible to catch up again on the progress of the closed-loop or open-loop control stopped during the waiting time until the internal state of the open-loop or closed-loop control has been established for the current clock cycle. From this time on, the open-loop or closed-loop control can operate in normal operation again. The closed-loop or open-loop control can therefore be undertaken by the host again, and the closed-loop or open-loop control on the client can stop the output of the replacement output value packets to the connected system and can instead output the output value packets received from the host.

In accordance with an eighth embodiment, the method in accordance with one of the first to seventh embodiments is expanded by the following steps of: the client device using the output value packets to generate a manipulated variable for a closed-loop controlled system that receives a manipulated variable from the client device, and the client device creating input value packets from a measurement variable received from a measurement element.

In accordance with a ninth embodiment, the method in accordance with the eighth embodiment is expanded by the following step of: the host device generating the output value packets for determining the manipulated variable by processing the input value packets created by the client device from the measurement variable.

In accordance with a tenth embodiment, the method in accordance with the fifth embodiment is expanded by the following step of: the host device transmitting the local processing module to the client device via an alternative communication connection.

The transmission of the local processing module need not be performed with the same low latency as the transmission of the input value packets or the output value packets. Therefore, a communication connection according to a standard with a higher latency can be used here via the air interface. If the client is not integrated in a mobile system or the mobile system containing the client is occasionally connected to the automation network via a plug-in connection, then wired communication can also be used to transmit the local processing module.

In accordance with an eleventh embodiment, the method in accordance with the fifth embodiment is expanded by the following step of: the host device creating the local processing module based on a base operating point predetermined by the host device.

Depending on the present operating point, it may be necessary to adapt the local processing module to the respectively present conditions. In a quasi-steady state, a linear system of equations in the algorithm of the local processing module may suffice. In the case of more complex states, however, another algorithm may be necessary. It is therefore advantageous to take into account the respective operating point when creating the local processing module on the host.

In accordance with a twelfth embodiment, the method in accordance with the first to eleventh embodiments is expanded by the following step of: the client device generating the replacement output value packets until a temporal or local limitation in the event that at least one packet is not received within a predefined period on the communication connection.

If data packets are transmitted only with a delay and the client creates the output value packets, then it may be useful for the client to perform open-loop or closed-loop control only within certain predefined temporal or local limits. It can therefore be ensured that a mobile system containing the client remains within a predefined local region, such as within the range of the radio connection. A temporal limitation on the creation of the replacement output value packets by the client makes it possible to achieve the situation in which the deviation from the predetermined base operating point does not become too large. A temporal restriction of the time over which the client creates the replacement output value packets can likewise prevent operational disruptions. Such operational disruptions arise, for example, from the fact that the client must have parameters that are known only to the host for operating the connected system. If the host creates output value packets, then the host takes these parameters into account when creating the output value packets. If, in contrast, the client creates replacement output value packets, then these parameters may not be taken into account. In the latter case, disruptions may then arise. These disruptions may be avoided by temporally limiting the generation of the replacement output value packets.

It is also an object of the invention to provide an automation network which is configured to perform the method in accordance with the disclosed embodiments and comprises a host device, at least one client device and a packet-based communication connection between the host device and the client device, where the client device is configured to generate and transmit input value packets to the host device via the communication connection, and the host device is configured to generate and transmit output value packets to the client device via the communication connection, and the client device is also configured to generate a replacement output value packet if the client device does not receive at least one output value packet within a predefined period via the communication connection.

It is also a further object of the invention to provide a host device having a processor and memory, where the host is configured to perform the method in accordance with the disclosed embodiments It is a further object of the invention to provide a client device having a processor and memory, where the client device is configured to perform the method in accordance with the disclosed embodiments.

Further possible implementations of the invention also comprise combinations which are not explicitly mentioned of features or embodiments described above or below with respect to the exemplary embodiments. In this case, a person skilled in the art will also add individual aspects as improvements or additions to the respective basic form of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The subclaims and the exemplary embodiments of the invention which are described below relate to further advantageous configurations and aspects of the invention. The invention is explained in more detail below on the basis of preferred embodiments with reference to the enclosed figures, in which:

DETAILED DESCRIPTION OF THE EXEMPLARY EMBODIMENTS

Identical or functionally identical elements have been provided with the same reference signs in the figures unless indicated otherwise.

Figure 1:
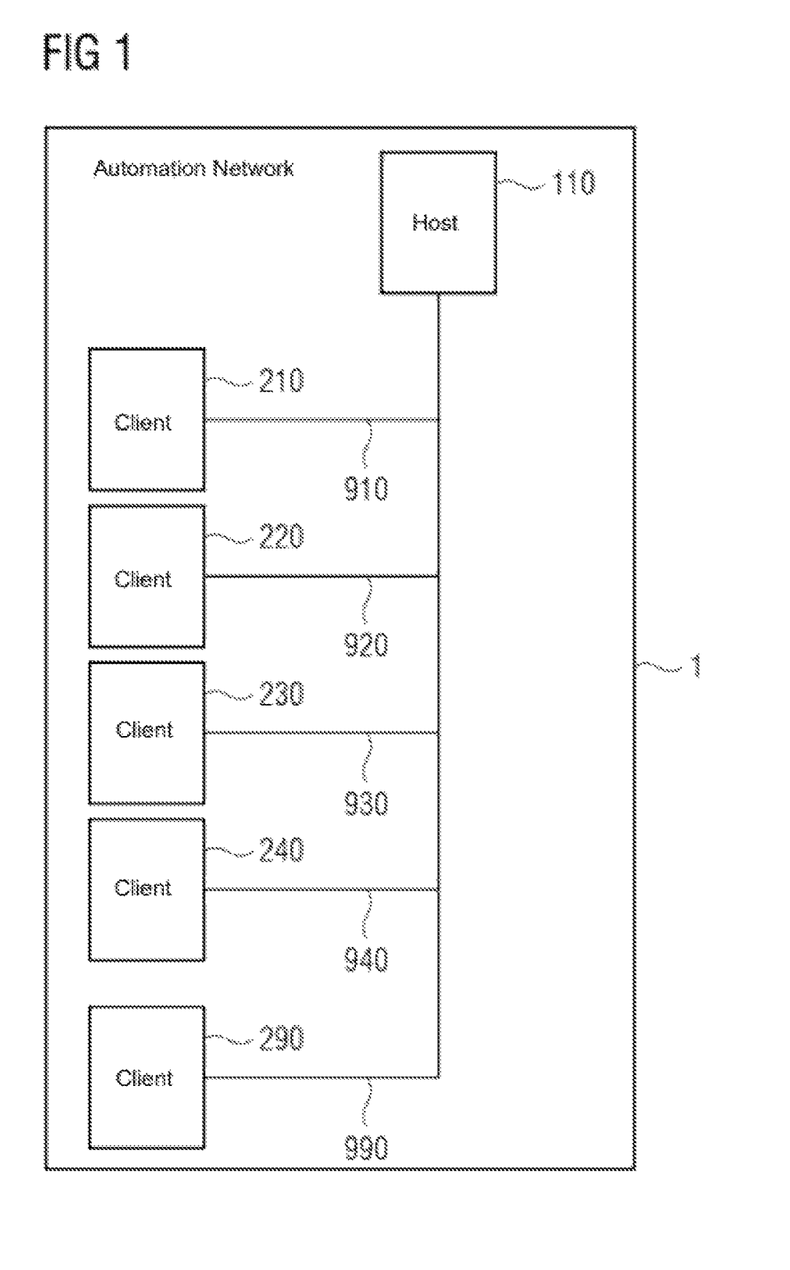
FIG. 1 is a schematic illustration of an automation network in accordance with the invention.
Figure 2:
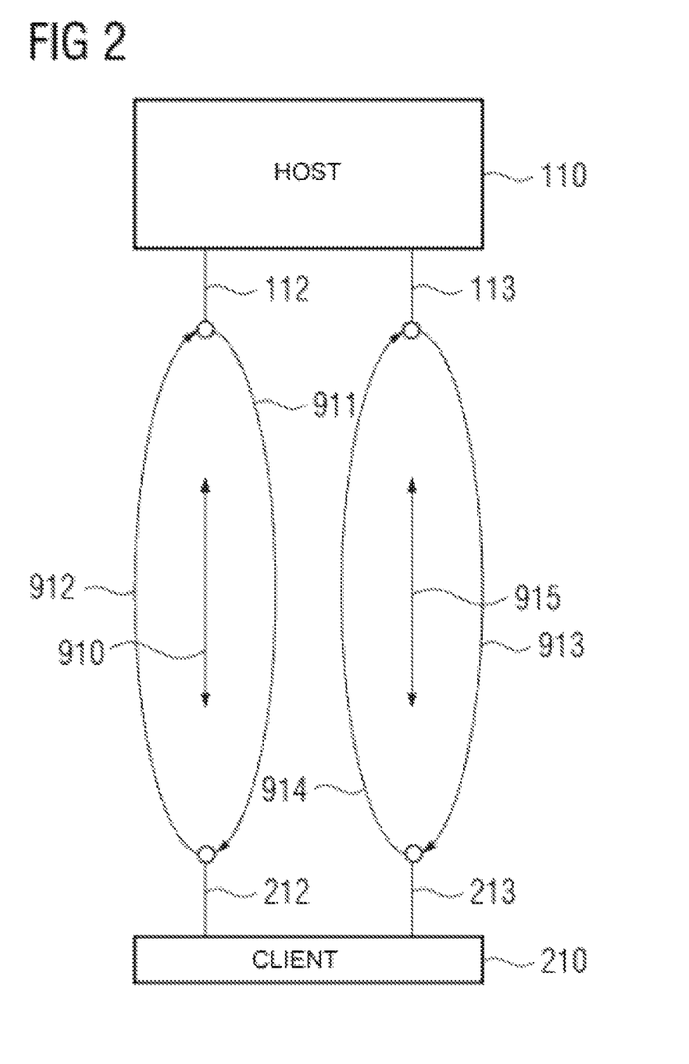
FIG. 2 is a schematic illustration of a host and a client from the degree of automation and the communication connections between the host and the client in accordance with the invention.

FIG. 1 schematically illustrates an automation network 1 having a host 110 which is connected to clients 210, 220, 230, 240, . . . , 290 via communication connections 910, 920, 930, 940, . . . , 990. By way of example, FIG. 2 schematically illustrates that the host 110 receives information emitted by the antenna 212 of the client 210 from the latter via an antenna 112 via the communication connection 912 and itself transmits information to the client via the communication connection 911. The communication connections 911 and 912 are part of the communication connection 910 in FIG. 1. Parallel to this communication connection, there is a communication connection 915 between the host and the client that is broken up into the communication connection 913, which is used by the host to transmit information to the client, and the communication connection 914, which is used by the host to receive information from the client. This communication connection 915 is preferably likewise implemented using radio. The antenna 113 is present on the host and the antenna 213 is present on the client for this communication connection 915.

Figure 3:
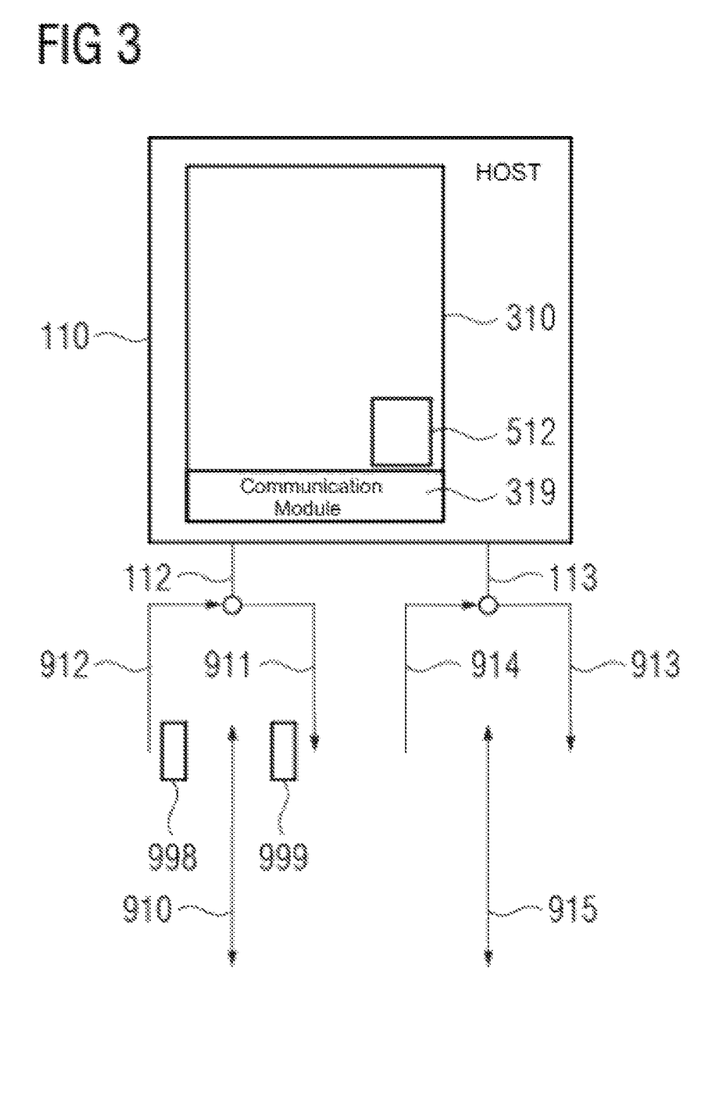
FIG. 3 is a schematic illustration of a host in accordance with the invention.

FIG. 3 shows, in detail, the structure of the host 110 that transmits output value packets 999 to the client via the antenna 112 in the downlink direction via the communication connection 911 and receives input value packets 998 from the client in the uplink direction via the communication connection 912. The communication connections 911 and 912 are parts of the communication connection 910 between the host 110 and the client 210. Information can be interchanged between the host 110 and the client 210 in a parallel manner via a further communication connection 915. The automation module 301 which performs open-loop and closed-loop control on the process on the client 210 is situated on the host 110. Here, the information, i.e., the input value packets, from the other clients is also taken into account. Further modules, not shown in the figure, for the open-loop and closed-loop control of the processes of the other clients 220 to 290 are likewise present on the host. Communication with the client 210 is effected via the communication module 319 using the connections 910 (consisting of the communication connections 911 and 912) and 915 (consisting of the communication connections 913 and 914). Further communication modules, which are not shown here, are provided for the other clients.

Figure 4:
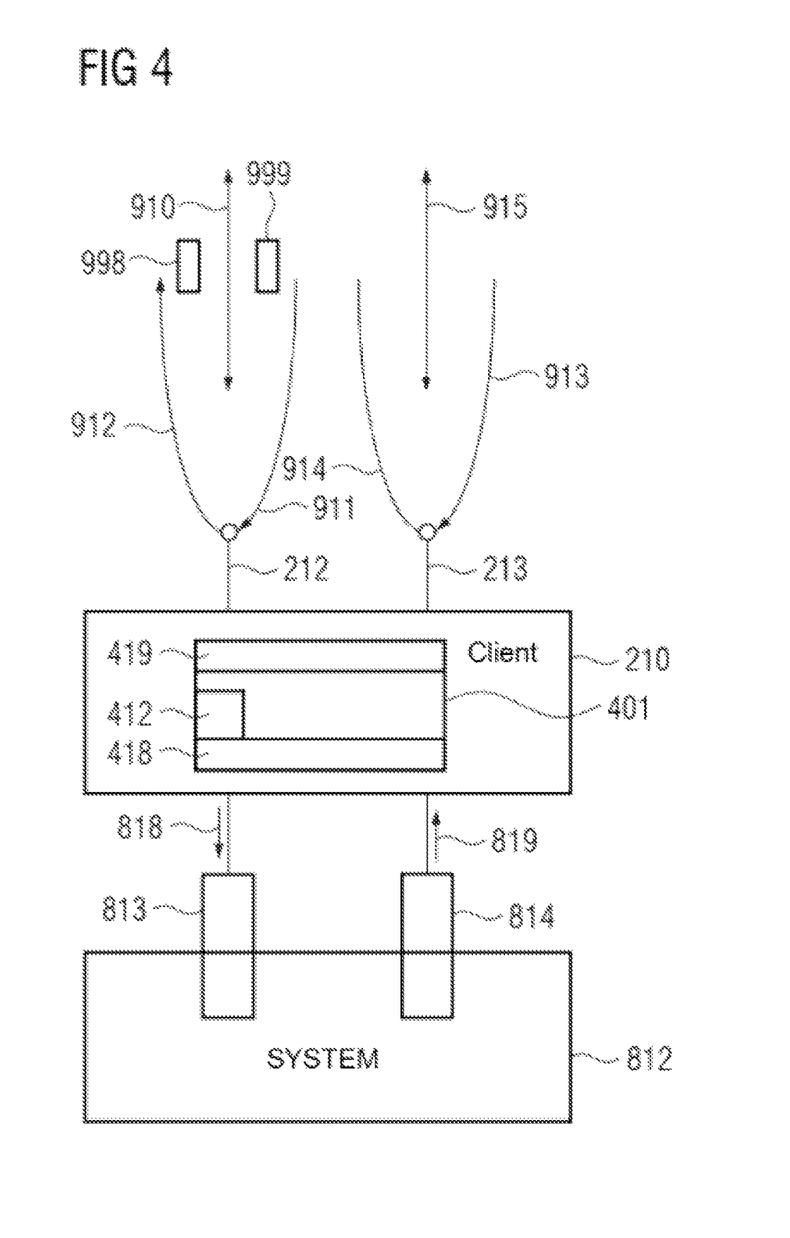
FIG. 4 is a schematic illustration of a client in accordance with the invention.

FIG. 4 is a detailed illustration of the client 210 that interchanges the input value packets 998 and the output value packets 999 with the host with the aid of the antenna 212 via the communication connections 911 and 912. The communication module 419 is contained in the module 401 for the open-loop and closed-loop control of the client and of the system connected to the client and monitors communication with the host. The client 210 outputs its output signals to inputs 813 of the system 812 controlled by the automation network 1 via the client 210 with the aid of the communication module 418 via a connection 818. This system 812 in turn passes signals to inputs of the client 210 with the aid of the communication connection 819 via outputs 814. In addition to the communication connections 911 and 912 that are based on radio, the client 210 also has the communication connection 915 to the host. If necessary, the local processing module 412 generates output value packets 999 for output to the inputs 813 of the connected system 812.

The local processing module 412 may be in the form of an app. Other possible embodiments comprise an implementation of the module as hardware in the form of an Application-specific integrated circuit (ASIC) or field programmable gate array (FPGA), for example. It should be understood that the module can also be provided as software, firmware or hardware in a multi-purpose processor or dedicated hardware. This local processing module 412 can be transmitted via the alternative communication connection 915. This communication connection may be in the form of a broadband radio connection with lower latency requirements, such as in accordance with the 5G standard eMBB.

Generally, it can be stated that the output value packets on the client need not necessarily be directly converted into outputs of the automation network. Output value packets may also be parameters for closed-loop control operations. One example is the instruction to change direction, which instruction comes from the host and is to be output, via the client, to a mode of transport as the connected system. Depending on the current state of the mode of transport, the client can then implement this instruction differently, for example, by outputting a command to control elements in the mode of transport or by changing the speeds of individual drives of the mode of transport, without details of the implementation on the client having to be explicitly described in the output value packets by the host.

A corresponding situation also applies to the input value packets transmitted from the client to the host. Although it is also possible for the client to transmit data received by the client from the connected system to the host without change, the client can also evaluate and process data received by the client from a mode of transport as the connected system, for example, before forwarding them to the host. The client can therefore convert, for example, speeds and data relating to the spatial orientation of the mode of transport into input value packets that contain only the current speed and direction of movement of the mode of transport.

Figure 5:
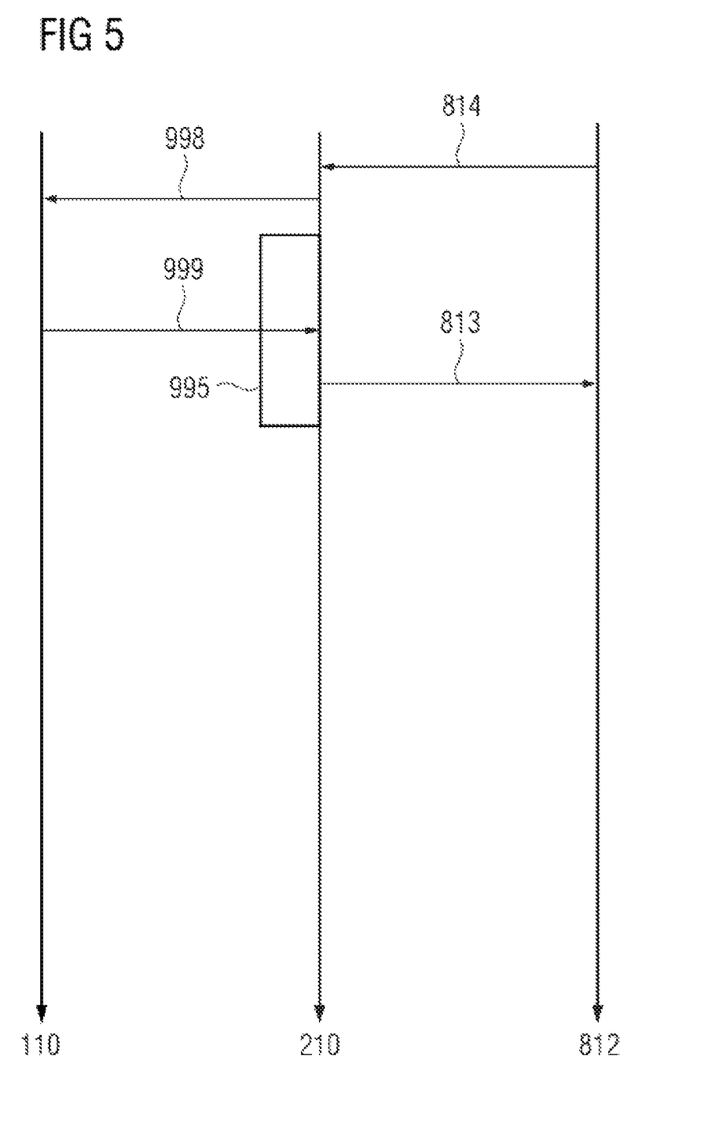
FIG. 5 is graphical plot of a timing diagram with communication between the host, the client and the connected system in accordance with the prior art.

FIG. 5 shows the normal temporal progress of communication between the system 812, the client 210 and the host 110, as performed in accordance with the prior art. The time arrows corresponding to these systems are indicated using the reference signs of the respective component for this purpose. The input values 814 of the automation network, i.e., outputs of the connected system 812, are forwarded by the client, as input value packets 998, to the host which, after appropriate processing, transmits output value packets 999 to the client. The client then determines the output values 813 and transmits them to the inputs of the system 812. After the client has transmitted the input value packets 998 to the host, a timer with the waiting time 995 is started on the client. It goes without saying that it is also possible to use other events to start the timer.

Figure 6:
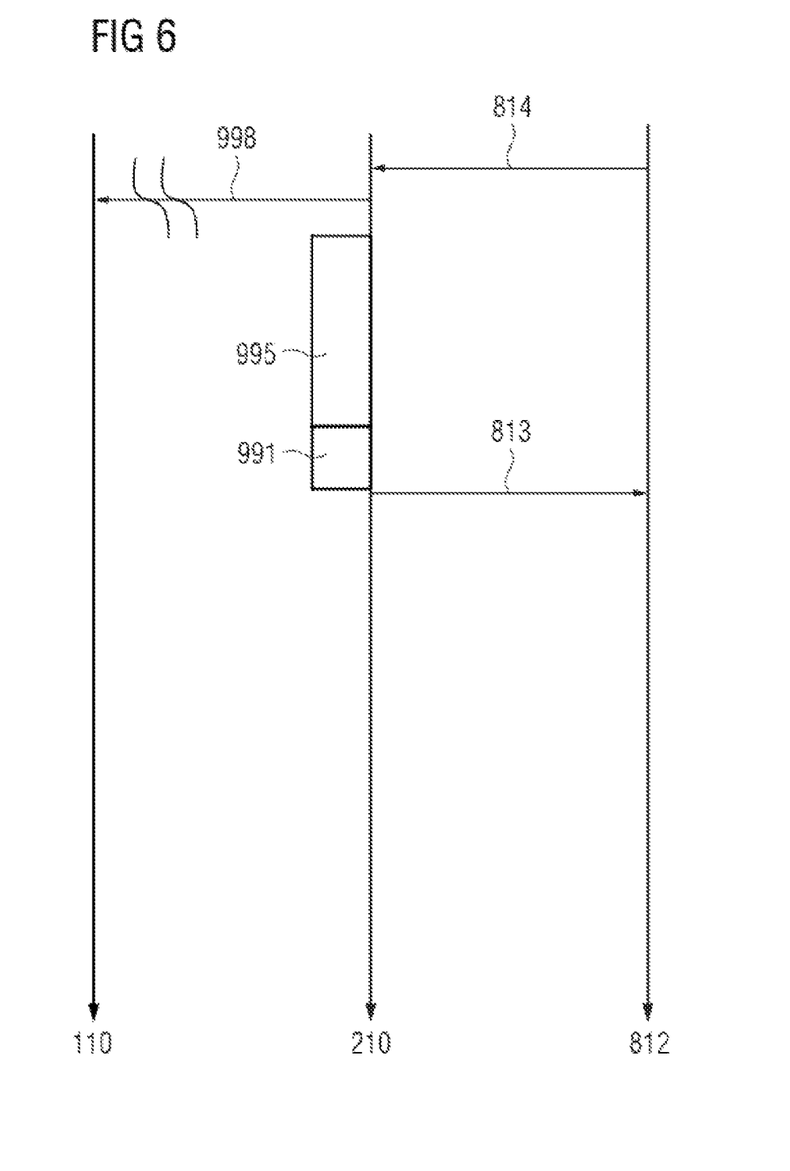
FIG. 6 is graphical plot of a timing diagram with communication between the host, the client and the connected system if an output value packet is not received by the client within a predefined period in accordance with the invention.

In a manner corresponding to FIG. 5, FIG. 6 shows the time progression in accordance with the invention if the transmission of the output value packets 999 is interrupted and/or is performed only with a delay. This can occur, for example, as a result of burst errors on the radio transmission path. A disruption in the immediate transmission of the input value packets is indicated here by wavy lines. After the expiry of a predefined waiting time 995, the client generates replacement output value packets 991 and outputs the corresponding output values 813 to the system 812. FIG. 6 does not illustrate the processes, whereby, on the one hand, the host transmits repetition requests to the client if an expected input value packet is not present and, on the other hand, the client can transmit repetition requests to the host if an expected output value packet is not present.

Figure 7:
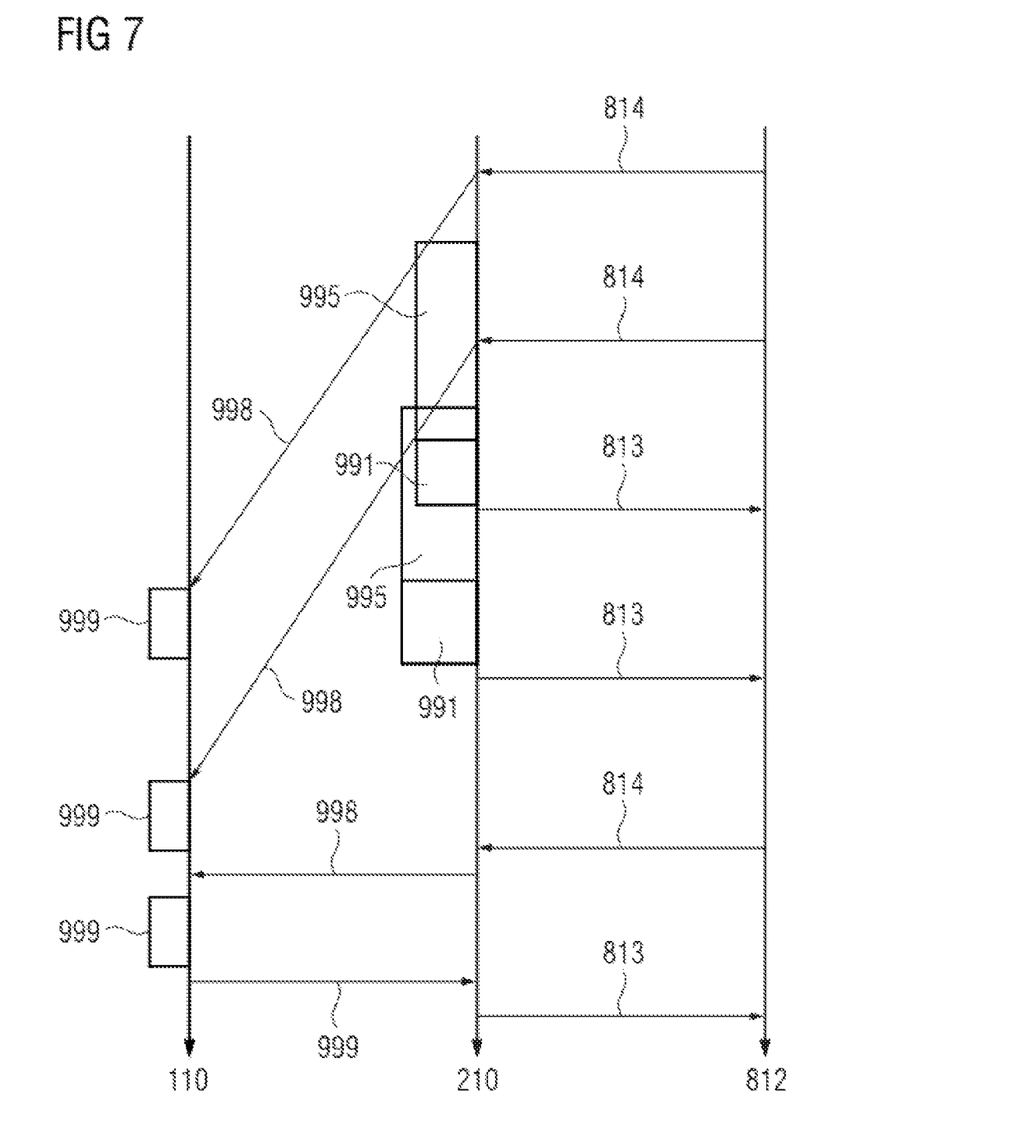
FIG. 7 is graphical plot of a timing diagram with communication between the host, the client and the connected system if an input value packet is not received by the host within a predefined period in accordance with the invention.

FIG. 7 shows the process if input value packets 998 are transmitted to the client with a delay. As in FIG. 6, the client also generates the replacement output value packets 991 here if corresponding packets are not available to it in a timely manner from the host and accordingly outputs data 813 to the system. This delayed transmission of two input value packets to the host is represented by the inclination of the arrows symbolizing the transmission of the input value packets 998. If input value packets arrive at the host with a delay, then the host evaluates the input value packets 998 in an accelerated manner. If, after processing all input value packets 998 which are processed with a delay and are distinguished based on the time stamp, the host now has available current output value packets 999 on account of the accelerated processing, then the host outputs them to the client. These output value packets 999 are then forwarded by the client to the system again as outputs 813. This is illustrated at the very bottom of FIG. 7 for the third input value packet.

Figure 8:
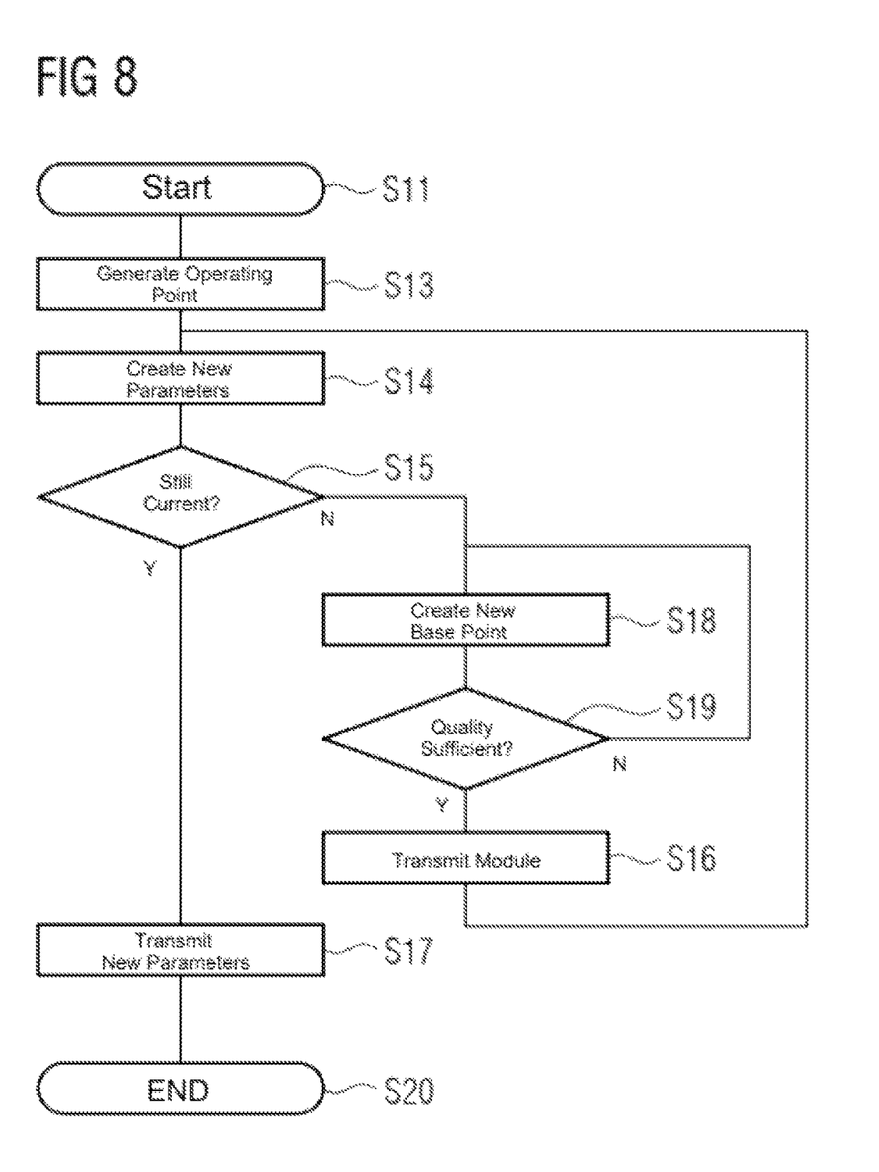
FIG. 8 is a flowchart of a method for operating the automation network in accordance with the invention.

FIG. 8 is a flowchart of the method in accordance with the fifth embodiment. The method begins in step S11. The current actual operating point is initially determined in step S13. In step S14, a new set of parameters is created by the host for the local processing module for this operating point.

At step S15, a check is performed to determine whether the base operating point is still current, i.e., the actual operating point has not diverged so far from the base operating point that the replacement closed-loop control can no longer conceivably provide any valid output values via the assigned processing module with the new parameterization. If this is the case, i.e., if the base operating point is still current, then the new parameters are transmitted, in step S17, to the client that parameterizes its local processing module 412 (see FIG. 4) with the parameters and executes it. If it was determined, in step S15, that the actual operating point has diverged too far from the base operating point, a new base operating point, together with the associated local processing module 512 (see FIG. 3), is created in step S18 based on the actual operating point and a check is performed to determine whether the processing module enables a sufficiently high closed-loop control quality for actual operating points in a sufficiently wide range around the base operating point. If this is not the case, then the method returns to step S18 with this information to generate a more suitable processing module there. If the processing module is suitable for closed-loop control, then it is transmitted to the client in step S16 and the method then returns to step 14 to now generate parameters for the current actual operating point based on the new processing module, which parameters are transmitted to the client in step S17 after successful verification in step S15. The method ends in step S20.

Figure 9:
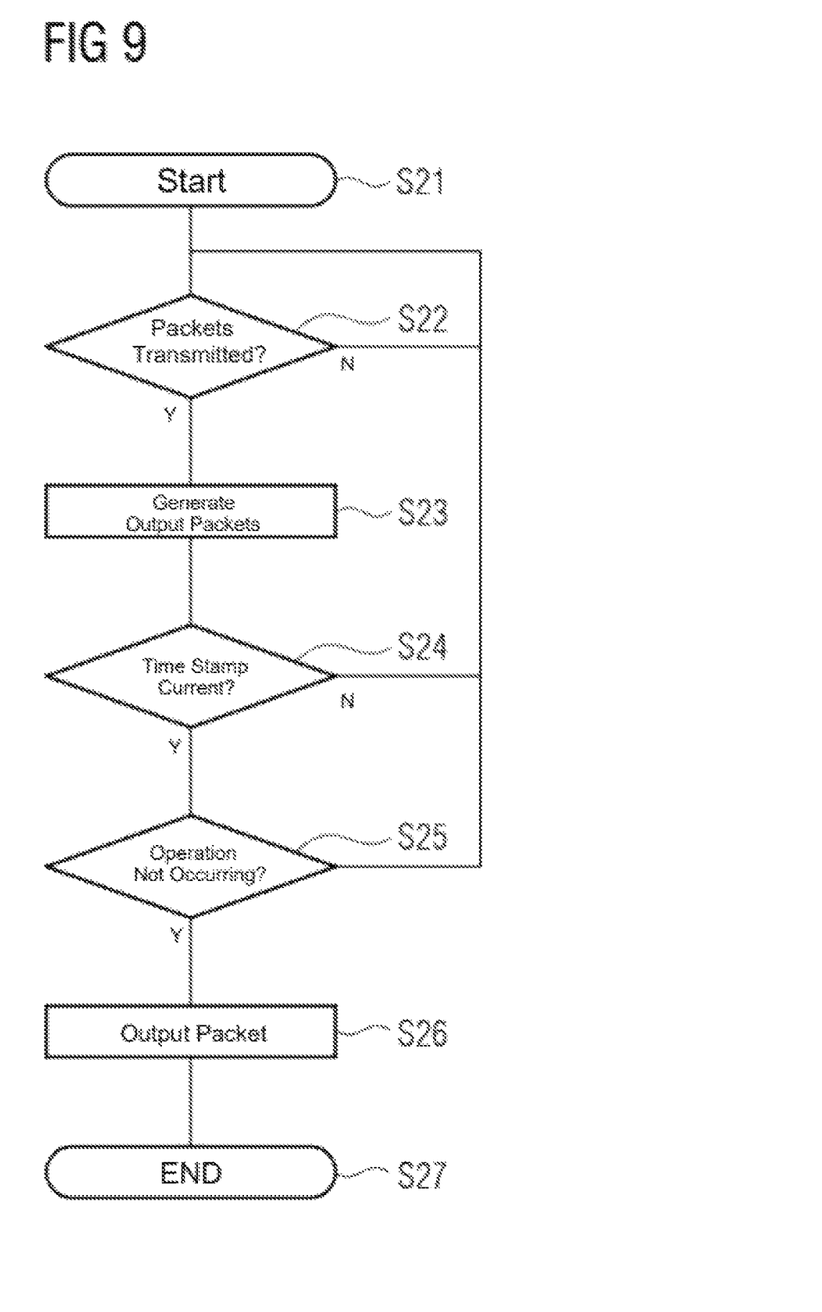
FIG. 9 is a flowchart of a sequence of the method on the host in accordance with the invention.

FIG. 9 is an illustration of the processes on the host for communication with the client. This method begins in step S21. In step S22, a check is performed to determine whether input value packets 998 have been transmitted by the client. If this is not the case, then the method returns to step S21. Otherwise, the host generates output value packets 999 in step S23 via suitable processing, for which data from other clients can also be used. If it is determined in step S24 that the time stamp of the input value packets is current, then a check is performed in step S25 to determine whether operation via the local processing module 412 is currently not occurring on the client. The host can then output the output value packet 999 that has just been calculated to the client in step S26. If operation via the local processing module is determined in step S25, then the system returns to step S22 to determine whether further input value packets that have not yet been processed are present. The method ends in step S27.

Here, it should be taken into account that the loss of input value packets is critical and actually must not occur at all, in particular if the host has tasks such as logging or archiving the system states. In the event of missing expected input value packets, the host therefore transmits requests to the client, in which the host asks the client to repeat the transmission. Accordingly, the client must have a buffer in which the input value packets transmitted by the client remain stored for a time in order to re-transmit them in the event of a repetition request from the host.

Figure 10:
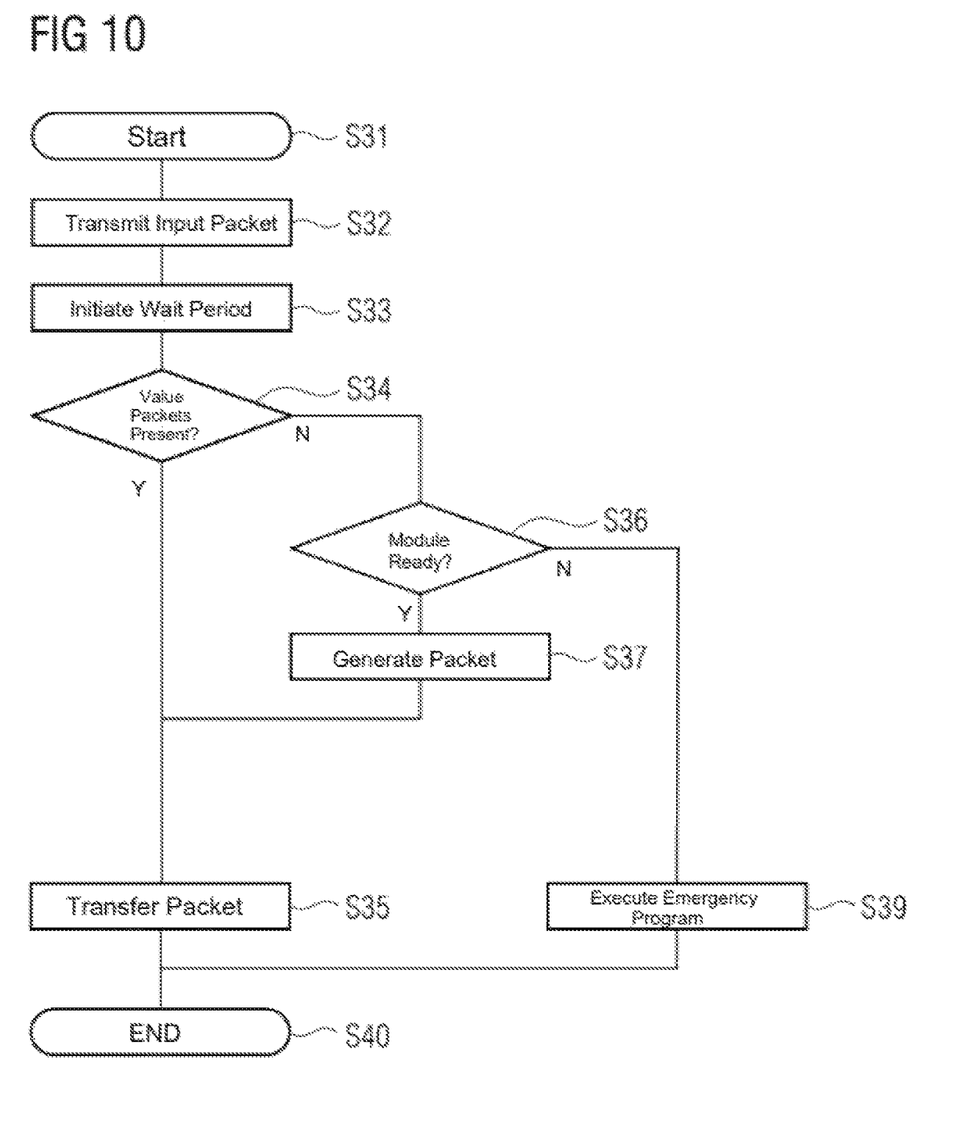
FIG. 10 is a flowchart of the sequence of the method on a client in accordance with the invention.

FIG. 10 is an illustration of the processes on the client for communication with the host. The method begins in step S31. In step S32, the client transmits the current input data packet 998 to the host. After a waiting time 995 (see FIGS. 5-7) symbolized by step S33, the method checks in step S34 whether corresponding output value packets 998 from the host are present. If this is the case, then this packet is transferred to the system in step S35 as output data 813 (see FIG. 4). If the check in step S34 was negative, a check is performed in step S36 to determine whether a local processing module 412 is ready for use. At step S36, a check is also performed to determine whether the system is within temporal or local limits for the operation of the local processing module 412. If both conditions are met, then the local processing module 412 generates, in step S37, an output value packet 999 which can then be output to the system in step S35. If a local processing module is not ready or if the system has left the predefined temporal or local limits, then the client executes an emergency program in step S39. Such an emergency program can cause an industrial truck to stop, for example, or can cause an immediate landing of a drone. The method ends in step S40.

The above disclosure makes it possible to perform complex closed-loop control tasks on a host if the host communicates with the client outputting the manipulated variables via a packet-based digital radio connection. Complex closed-loop control tasks can therefore be performed on a non-local automation system even in mobile systems or systems which are otherwise difficult to wire. Here, non-local means that an external automation system for the client directly connected to the system to be subjected to open-loop or closed-loop control is involved. Compact drones, for example, the clients of which are limited with respect to system resources and have a comparatively low computing power, can therefore be subjected to open-loop and closed-loop control using complex methods that have a high resource requirement.

A further advantage of the present disclosure is in the ability to adapt the open-loop or closed-loop control system, which is implemented in the client device and is equipped with low complexity in comparison with the host, to the current situation, i.e., the actually present operating point.

In the case of pure digital radio transmission, as an alternative or in addition to the methods mentioned, it is possible to use a plurality of redundant radio channels that are as independent of one another as possible, for example, in frequency bands that are far apart, with different modulation methods and/or with different spatial transmission modes.

As an alternative to the above-described digital radio methods, it is also possible to use optical communication methods. A reduced sensitivity to interference can be achieved here.

Although the present invention has been described on the basis of exemplary embodiments, it can be modified in various ways.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an automation network having a host device, at least one client device and a packet-based communication connection arranged between the host device and the client device, the method comprising:

generating, by the at least one client device, input value packets and transmitting the generated input value packets to the host device via the packet-based communication connection;

generating, by the host device, output value packets and transmitting the generated output value packets to the at least one client device via the packet-based communication connection; and generating, by the client device, a replacement output value packet if the at least one client device fails to receive at least one output value packet within a predefined period via the packet-based communication connection;

wherein the replacement output value packets are generated by the at least one client device based on at least one base operating point predetermined by the host device.

2. The method as claimed in claim 1, wherein the replacement output value packets are generated by the at least one client device with the aid of a local processing module assigned to the at least one client device.

3. The method as claimed in claim 2, wherein the host device transmits parameters for the local processing module to the at least one client device.

4. The method as claimed in claim 2, wherein the host device transmits the local processing module to the at least one client device.

5. The method as claimed in claim 4, wherein the host device transmits the local processing module to the at least one client device.

6. The method as claimed in claim 4, wherein the host device transmitting the local processing module to the at least one client device via an alternative communication connection.

7. The method as claimed in claim 4, wherein the host device creates the local processing module based on a base operating point predetermined by the host device.

8. The method as claimed in claim 1, wherein the host device determines the at least one predetermined base operating point at predetermined times.

9. The method as claimed in claim 1, wherein the at least one host device generates the output value packets in an accelerated manner until the host device has processed a current input value packet in a timely manner in an event that at least one input value packet is not received within a predefined period on the communication connection in a direction from the at least one client device to the host device; and wherein the at least one client device generates the replacement output value packets continuously until a current input value packet has been received on the host device and the host device generates the output value packets from this time on.

10. The method as claimed in claim 9, wherein the at least one client device utilizes the output value packets to generate a manipulated variable for a closed-loop controlled system which receives a manipulated variable from the at least one client device; and wherein the at least one client device creates the input value packets from a measurement variable received from a measurement element.

11. The method as claimed in claim 10, wherein the host device generates the output value packets for determining the manipulated variable by processing the input value packets created by the at least one client device from the measurement variable.

12. The method as claimed in claim 1, wherein the at least one client device generates the replacement output value packets until a temporal or local limitation in an event that at least one packet is not received within a predefined period on the packet-based communication connection.

13. An automation network comprising:
a host device;
at least one client device; and
a packet-based communication connection arranged between the host device and the at least one client device;
wherein the at least one client device is configured to generate and transmit input value packets to the host device via the packet-based communication connection;
wherein the host device is configured to generate and transmit output value packets to the at least one client device via the packet-based communication connection;
wherein the at least one client device is further configured to generate a replacement output value packet if the at least one client device fails to receive at least one output value packet within a predefined period via the packet-based communication connection; and
wherein the replacement output value packet is generated by the at least one client device based on at least one base operating point predetermined by the host device.

14. A host device comprising:
a processor; and
memory;
wherein the host device is configured to:
receive input value packets from a client device, said input packets being generated and transmitted by the client device via a packet-based communication connection; and
generate output value packets and transmit the generated output value packets to the client device via the packet-based communication connection; and
wherein the client device generates a replacement output value packet if the client device fails to receive at least one output value packet within a predefined period from the host device via the packet-based communication connection; and
wherein the replacement output value packet is generated by the at least one client device based on at least one base operating point predetermined by the host device.

15. A client device comprising
a processor; and
memory;
wherein the client device is configured to:
generate input value packets and transmit the generated input value packets to a host device via a packet-based communication connection;
receive output value packets from the host device via the packet-based communication connection, said output value packets being generated and transmitted to the client device via the packet-based communication connection; and
generate a replacement output value packet if at least one output value packet is not received within a predefined period via the packet-based communication connection;
wherein the replacement output value packets are generated based on at least one base operating point predetermined by the host device.

* * * * *